(12) United States Patent
Ide (10) Patent No.: US 9,437,187 B2
(45) Date of Patent: Sep. 6, 2016

(54) VOICE SEARCH DEVICE, VOICE SEARCH METHOD, AND NON-TRANSITORY RECORDING MEDIUM

(71) Applicant: CASIO COMPUTER CO., LTD., Shibuya-ku, Tokyo (JP)

(72) Inventor: Hiroyasu Ide, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/604,345

(22) Filed: Jan. 23, 2015

(65) Prior Publication Data
US 2015/0255059 A1 Sep. 10, 2015

(30) Foreign Application Priority Data

Mar. 5, 2014 (JP) ................................. 2014-042542

(51) Int. Cl.
| | |
|---|---|
| G10L 15/00 | (2013.01) |
| G10L 15/08 | (2006.01) |
| G06F 17/30 | (2006.01) |
| G10L 15/02 | (2006.01) |
| G10L 25/54 | (2013.01) |
| G10L 25/87 | (2013.01) |

(52) U.S. Cl.
CPC ......... *G10L 15/08* (2013.01); *G06F 17/30743* (2013.01); *G06F 17/30755* (2013.01); *G10L 15/02* (2013.01); *G10L 25/54* (2013.01); *G10L 25/87* (2013.01); *G10L 2015/025* (2013.01); *G10L 2015/081* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 6,535,850 B1 * | 3/2003 | Bayya | ..................... | G10L 15/07 704/239 |
| 6,662,180 B1 * | 12/2003 | Aref | .................. | G06F 17/30625 |
| 6,873,993 B2 * | 3/2005 | Charlesworth | ... | G06F 17/30017 704/251 |

(Continued)

OTHER PUBLICATIONS

Keisuke Iwami, et al, "Strict Distance Measure for a Spoken Term Detection Method Based on a Syllable n-gram Index with Distance Metric", IPSJ Journal, vol. 54, No. 2, pp. 495-505, 2013.

(Continued)

*Primary Examiner* — Jesse Pullias
(74) *Attorney, Agent, or Firm* — Holtz, Holtz & Volek PC (57) ABSTRACT

A search string acquiring unit acquires a search string. A converting unit converts the search string into a phoneme sequence. A time length deriving unit derives the spoken time length of the voice corresponding to the search string. A zone designating unit designates a likelihood acquisition zone in a target voice signal. A likelihood acquiring device acquires a likelihood indicating how likely the likelihood acquisition interval is an interval in which voice corresponding to the search string is spoken. A repeating unit changes the likelihood acquisition zone designated by the zone designating unit, and repeats the process of the zone designating unit and the likelihood acquiring device. An identifying unit identifies, from the target voice signal, estimated intervals for which the voice corresponding to the search string is estimated to be spoken, on the basis of the likelihoods acquired for each of the likelihood acquisition zones.

18 Claims, 8 Drawing Sheets

(56) References Cited

U.S. PATENT DOCUMENTS

| | | | | |
|---|---|---|---|---|
| 7,904,296 B2* | 3/2011 | Morris | ............... | G10L 15/04 704/231 |
| 7,983,915 B2* | 7/2011 | Knight | ............. | G06F 17/30026 704/254 |
| 2007/0033003 A1* | 2/2007 | Morris | ............... | G10L 15/04 704/9 |

OTHER PUBLICATIONS

Related U.S. Appl. No. 14/597,958, filed Jan. 15, 2015, First Named Inventor: Hiroki Tomita, Title: "Voice Search Device, Voice Search Method, and Non-Transitory Recording Medium".

Yaodong Zhang, et al., "An Inner-Product Lower-Bound Estimate for Dynamic Timewarping", ICASSP 2011, pp. 5660-5663.

* cited by examiner

VOICE SEARCH DEVICE, VOICE SEARCH METHOD, AND NON-TRANSITORY RECORDING MEDIUM

CROSS-REFERENCE TO RELATED APPLICATION

This application Claims the benefit of Japanese Patent Application No. 2014-42542, filed on Mar. 5, 2014, the entire disclosure of which is incorporated by reference herein.

FIELD

The present disclosure relates to a voice search device, a voice search method, and a non-transitory recording medium.

BACKGROUND

Recently, as multimedia content such as voice and video expands and prevails, precise multimedia search technology is demanded. With regard to voice search, there is ongoing research about voice search technology that identifies a location within voice where the voice corresponding to a given search word is spoken. With voice search, because of characteristic issues such as the difficulty of voice recognition, a search technique with sufficient performance has not been established compared to string search that identifies a location that includes a desired search word within a string. For this reason, various technologies for realizing voice search of sufficient performance are being researched.

SUMMARY

For example, Non-Patent Literature 1 (Y. Zhang and J. Glass, "An inner-product lower-bound estimate for dynamic time warping," in Proc. ICASSP, 2011, pp. 5660-5663) discloses a method of comparison that compares voice signals each other quickly. Consequently, a location corresponding to a query input as voice may be quickly identified from a target voice signal.

However, in Non-Patent Literature 1, since the query is input as voice, if the target voice signal includes voice from multiple speakers, the voice of a speaker with features similar to the voice of the person who inputs the query is prioritized in some cases.

Also, the method of inputting the query as voice is unusable when the voice of the person who inputs the query is acoustically wired, or if the person who inputs the query has difficulty speaking in the first place.

The present disclosure has been devised to solve problems like the above, and takes as an objective thereof to provide a voice search device, a voice search method, and a non-transitory recording medium enabling precise and quick voice search.

In order to achieve the above objective, a voice search device according to the present disclosure comprises:

a search string acquirer acquiring a search string;

a converter converting the search string acquired by the search string acquirer into a phoneme sequence;

a time length deriver acquiring a duration of each phoneme included in the phoneme sequence converted by the converter, and deriving a spoken time length of voice corresponding to the search string based on the acquired durations;

a zone designator designating a likelihood acquisition zone that is a zone of the time length derived by the time length deriver in a target voice signal;

a likelihood acquirer acquiring a likelihood indicating how likely the likelihood acquisition zone designated by the zone designator is a zone in which voice corresponding to the search string is spoken;

a repeater changing the likelihood acquisition zone designated by the zone designator, and repeating a process of the zone designator and the likelihood acquirer; and an identifier identifying, on the basis of the likelihood acquired by the likelihood acquirer for each likelihood acquisition zone designated by the zone designator, from the target voice signal an estimated zone for which the voice corresponding to the search string is estimated to be spoken.

According to the present disclosure, precise and quick voice search is possible.

BRIEF DESCRIPTION OF THE DRAWINGS

A more complete understanding of this application can be obtained when the following detailed description is considered in conjunction with the following drawings, in which.

DETAILED DESCRIPTION

Hereinafter, embodiments of the present disclosure will be described with reference to the drawings. Note that in the drawings, identical or corresponding parts are denoted with identical signs.

(Embodiment 1)

Figure 1:
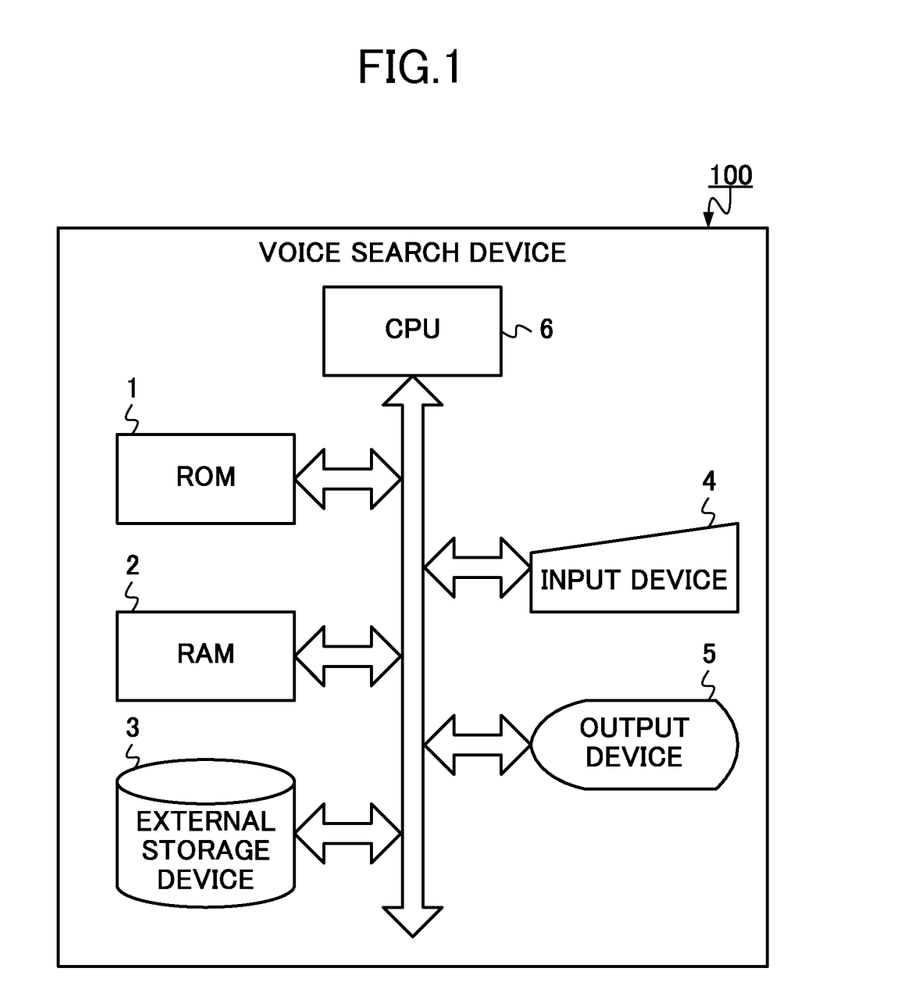
FIG. 1 is a diagram illustrating a physical configuration of a voice search device according to Embodiment 1 of the present disclosure.

The voice search device according to Embodiment 1 is physically configured as illustrated in FIG. 1. The voice search device 100 is equipped with read-only memory (ROM) 1, random access memory (RAM) 2, an external storage device 3, an input device 4, an output device 5, and a central processing unit (CPU) 6.

The ROM 1 stores an initial program for configuring various initial settings, conducting a hardware test, loading a program, and the like. The RAM 2 temporarily stores information such as various software programs executed by the CPU 6, and data required for the execution of these software programs.

The external storage device 3 is a hard disk or the like, for example, and stores information such as various software programs and data. These software programs include application software programs and a basic software program such as an operating system (OS).

The input device 4 is a keyboard or the like, for example. The input device 4 inputs, into the CPU 6, information such as text data input by the user operating the keyboard. The output device 5 is equipped with a screen such as a liquid crystal display and a speaker, for example. The output device 5 displays text data output by the CPU 6 onto the screen, and outputs audio or voice data from the speaker.

The CPU 6, by loading a software program stored in the external storage device 3 into the RAM 2, and controlling the execution of the software program, realizes the following functional configuration.

Figure 2:
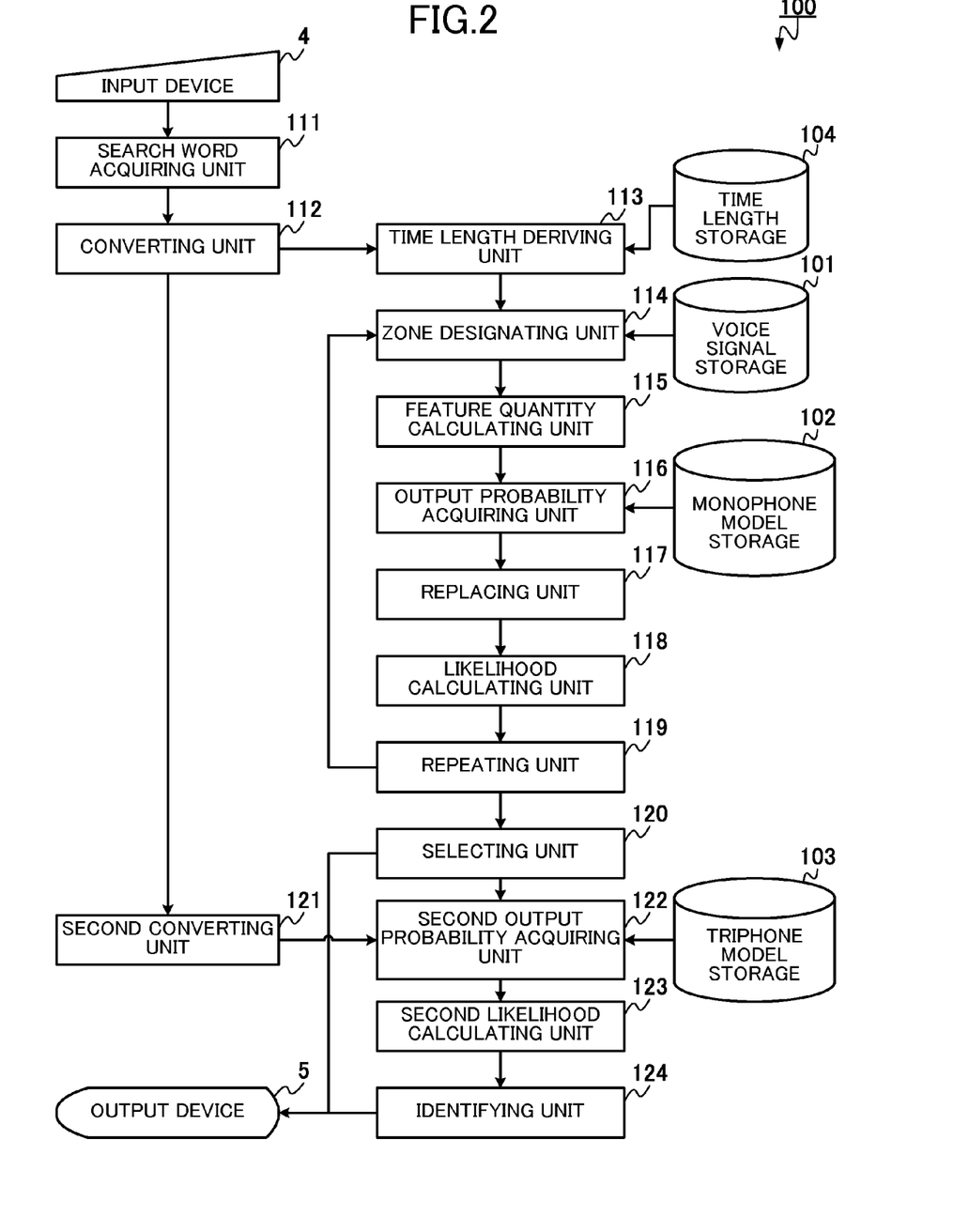
FIG. 2 is a diagram illustrating a functional configuration of a voice search device according to Embodiment 1 of the present disclosure.

The voice search device 100 is functionally configured as illustrated in FIG. 2. The voice search device 100 is equipped with voice signal storage 101, monophone model storage 102, triphone model storage 103, time length storage 104, a search string acquiring unit 111, a converting unit 112, a time length deriving unit 113, an zone designating unit 114, a feature quantity calculating unit 115, an output probability acquiring unit 116, a replacing unit 117, a likelihood calculating unit 118, a repeating unit 119, a selecting unit 120, a second converting unit 121, a second output probability acquiring unit 122, a second likelihood calculating unit 123, and an identifying unit 124. The voice signal storage 101, the monophone model storage 102, the triphone model storage 103, and the time length storage 104 are constructed as storage areas in the external storage device 3.

The voice signal storage 101 stores a target voice signal. The target voice signal may be a voice signal related to voice from a news broadcast or the like, voice from a recorded meeting, or voice from a movie or the like, for example.

The monophone model storage 102 and the triphone model storage 103 store acoustic models. The acoustic models model the frequency characteristics of respective phonemes that constitute strings acquirable as a search string. Specifically, the monophone model storage 102 stores an acoustic model based on monophones, that is, 1-sound phonemes (monophone model), while the triphone model storage 103 stores an acoustic model based on triphones, that is, 3-sound phonemes (triphone model).

A monophone model is an acoustic model generated per every one phoneme, and does not depend on adjacent phonemes. In other words, the monophone model is an acoustic model with fixed state transitions between the previous and next phoneme state. A triphone model is an acoustic model generated per every three phonemes, and depends on adjacent phonemes. In other words, the triphone model is an acoustic model that accounts for state transitions between the previous and next phoneme state. The voice search device 100 learns the monophone model and the triphone model with a typical method, and stores the learned models the monophone model storage 102 and the triphone model storage 103, respectively.

A hidden Markov model (HMM), which is a typical acoustic model used for voice recognition, may be used as the monophone model and the triphone model, for example. An HMM is a model for probabilistically estimating, from a voice signal, the original words output by the voice signal using a statistical technique. An HMM uses standard patterns that parameterize the transition probability, which indicates the temporal fluctuation of states, and the probability of outputting a feature quantity input from each state (output probability). The output probability is expressed by a Gaussian mixture distribution obtained by adding together Gaussian (normal) distributions weighted by predetermined weighting coefficients.

The time length storage 104 stores the average duration of each phoneme used by the acoustic model, in units of the states of each phoneme. The average duration of each phoneme is the average time length when each phoneme is spoken. The states of each phoneme are units that subdivide each phoneme in the time direction, and correspond to the minimum units of the acoustic model. Each phoneme has a predetermined number of states.

Hereinafter, the case in which "3" is the predetermined number of states for each phoneme will be described as an example. For example, the phoneme "a" is subdivided into the three states of a first state "a1" that includes the start of the phoneme when spoken, a second state "a2" which is an intermediate state, and a third state "a3" that includes the end of the phoneme when spoken. Provided that Q is the number of all phonemes used by the acoustic model, there exist (3×Q) states. For each of the (3×Q) states, the voice search device 100 calculates the average value of the duration from a large set of voice signal data, and stores the calculated average values in the time length storage 104 in advance.

Note that to improve search accuracy, the voice signals used to learn the acoustic model and the voice signal used to calculate the average durations of the phonemes are preferably spoken in the same domain (environment) as the domain in which the target voice signal is spoken. For example, if the target is a voice signal recorded in a conference room, it is preferable to learn the acoustic model and calculate the average durations of the phonemes using voice signals recorded in a conference room. However, the voice signals used to learn the acoustic model and the voice signal used to calculate the average durations of the phonemes may also be spoken in a domain that differs from the domain in which the target voice signal is spoken.

The search string acquiring unit 111 acquires a search string. The search string acquiring unit 111 acquires a search string input by the user via the input device 4, for example. In other words, the user supplies the voice search device 100 with a text string as the search word to use for retrieving the part of the target voice signal in which the desired voice is spoken.

The converting unit 112 sorts phonemes of the monophone model, which is an acoustic model that does not depend on adjacent phonemes, in accordance with the search string acquired by the search string acquiring unit 111, and converts the search string into a phoneme sequence. In other words, the converting unit 112 converts the search string into a monophone phoneme sequence by arranging the phonemes (monophones) used when speaking each word in the same order as the words included in the search string.

For example, if the Japanese word "ramen" is input as the search string, since "ramen" includes the five phonemes (monophones) of "r", "a:", "m", "e", and "N", the converting unit 112 generates the phoneme sequence "r, a:, m, e, N". Alternatively, if the English word "cake" is input as the search string, since "cake" includes the four phonemes (monophones) of "k", "e", "i", and "k", the converting unit 112 generates the phoneme sequence "k, e, i, k".

The time length deriving unit 113 acquires, from the time length storage 104, the average duration of each phoneme included in the phoneme sequence converted by the converting unit 112. Subsequently, on the basis of the acquired average durations, the time length deriving unit 113 derives the spoken duration of the voice corresponding to the search string.

In other words, since the search word is acquired as a text string, the voice search device 100 is unable to directly obtain information about the spoken time length of the voice corresponding to the search word. For this reason, typical spoken durations for each state of the phonemes are prepared in the time length storage 104 in advance, and the voice search device 100 uses the durations for each state to estimate the spoken time length of the voice corresponding to the search string acquired by the search string acquiring unit 111.

For example, if the phoneme sequence is "r, a:, m, e, N", the time length deriving unit 113 acquires the average durations, stored in the time length storage 104, of three states for each of these five phonemes, for a total of 15 average durations. Subsequently, the time length obtained by summing the acquired 15 average durations is derived as the spoken time length of the voice corresponding to the search string.

The zone designating unit 114 acquires a target voice signal from the voice signal storage 101, and designates likelihood calculation zones, which are zones of the time length derived by the time length deriving unit 113, in order from the beginning of the target voice signal. Likelihood is an index that indicates the degree of similarity between the voice corresponding to the search string and the voice signal of the designated zone. To compare the phoneme sequence converted from the search string to a voice signal, the zone designating unit 114 extracts the voice signal within the designated likelihood calculation zone, and associates each frame included in the extracted voice signal with the state of each phoneme included in the phoneme sequence.

Figure 3:
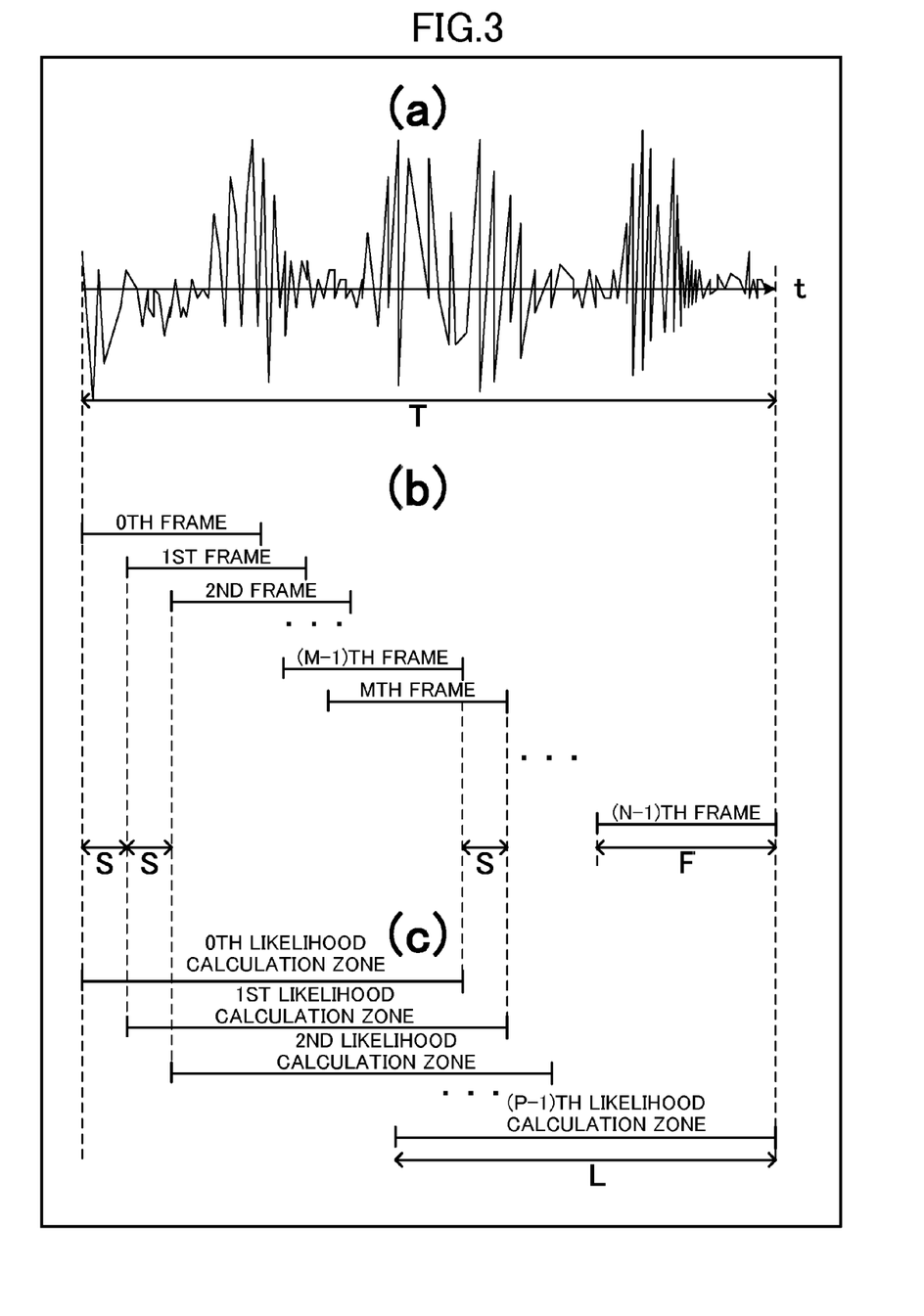
FIG. 3 is a diagram, wherein: (a) is waveform diagram of a target voice signal, (b) is a diagram illustrating frames set in a target voice signal, and (c) is a diagram illustrating likelihood calculation zones designated in a target voice signal.

A frame is a time window having a predetermined time length in the voice signal. Frames set in a target voice signal will be described specifically with reference to FIGS. 3A to 3C. FIG. 3(*a*) is a waveform diagram of a target voice signal of time length T from beginning to end. The vertical axis indicates the magnitude of the amplitude (energy) of the waveform, while the horizontal axis indicates the time t. FIG. 3(*b*) illustrates frames set in the target voice signal illustrated in FIG. 3(*a*). N frames from the 0th frame to the (N−1)th frame, each of a frame length F, are set by shifting each frame by a predetermined shift length S.

The frame length F and the shift length S are matched to the time length set when creating the acoustic model (such as frame length F=25 ms and shift length S=10 ms, for example). Since the frame length F is longer than the shift length S, each frame overlaps with adjacent frames by a time length (F−S).

FIG. 3(*c*) illustrates likelihood calculation zones designated by the zone designating unit 114 in a target voice signal. First, the zone designating unit 114 designates the 0th likelihood calculation zone of time length L that includes M frames from the 0th frame to the (M−1)th frame.

The feature quantity calculating unit 115 calculates, for each frame, a feature quantity of the target voice signal in the likelihood calculation zone designated by the zone designating unit 114. The feature quantity is obtained by combining frequency-related feature parameters obtained by converting voice data on the frequency axis, called the cepstrum or mel-frequency cepstrum, with power-related feature parameters obtained by calculating the sum of squares or the logarithm of the energy of the voice data, for example.

For example, the feature quantity is made up of a 38-dimensional vector quantity having a total of 38 components. The 38-dimensional vector quantity is made up of 12 components (12 dimensions) of frequency-related feature parameters, 1 component (1 dimension) of a power-related feature parameter, 12 components (12 dimensions) of delta frequency-related feature parameters, 1 component (1 dimension) of a delta power-related feature parameter, and 12 components (12 dimensions) of delta-delta frequency-related feature parameters. Note that the 12 components (12 dimensions) of delta frequency-related feature parameters are the result of taking the difference with respect to each component in the previous time window. Also, the 12 components (12 dimensions) of delta-delta frequency-related feature parameters are the result of taking the difference of the difference with respect to each component in the previous time window.

The output probability acquiring unit 116, on the basis of the feature quantity calculated by the feature quantity calculating unit 115, acquires for each frame an output probability of the feature quantity being output from each phoneme included in the phoneme sequence. Specifically, the output probability acquiring unit 116 acquires the monophone model from the monophone model storage 102, and compares the feature quantity in each frame calculated by the feature quantity calculating unit 115 to the monophone model of the state corresponding to the relevant frame from among the states of the phonemes included in the phoneme sequence. Subsequently, the output probability acquiring unit 116 calculates the probability that the feature quantity in each frame will be output from the corresponding state. This output probability is expressed as a normalized continuous mixture distribution obtained by the weighted addition of multiple Gaussian distributions.

After the output probability acquiring unit 116 acquires the output probability for all frames in the likelihood calculation zone, the replacing unit 117 replaces each acquired output probability with the output probability of maximum value from among the multiple output probabilities acquired in multiple consecutive frames that include the relevant output probability. This replacement process is called lower-bounding.

Figure 4:
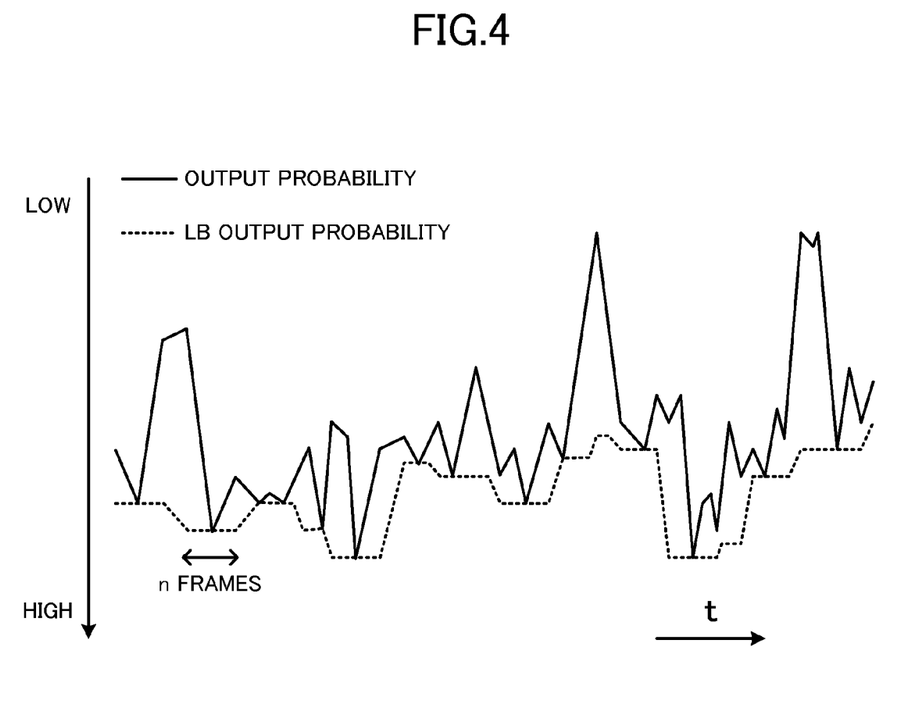
FIG. 4 is a diagram illustrating an example of lower-bounding the output probability.

Lower-bounding will be described specifically with reference to FIG. 4. In FIG. 4, the solid line indicates the output probability acquired for each frame. The vertical axis goes higher as the height of the output probability decreases, while the horizontal axis indicates the time t. The replacing unit 117 replaces the output probability of each frame with the maximum output probability from among n adjacent frames. Herein, n is set to a number of frames corresponding to 100 ms, for example. As a result of the replacement, the output probability indicated by the solid line is converted into an output probability whose value changes less over time, as illustrated by the lower-bounded (LB) output probability indicated by the dashed line.

By lower-bounding in this way, the error between the average duration and the actual duration of each phoneme stored in the time length storage 104, and the error between the spoken time length of the voice corresponding to the search string derived by the time length deriving unit 113 and the actual spoken time length, may be absorbed within the range of the n adjacent frames.

The likelihood calculating unit 118, on the basis of the output probabilities replaced by the replacing unit 117, calculates a likelihood that indicates how likely the likelihood calculation zone designated by the zone designating unit 114 is an zone in which the voice corresponding to the search string is spoken. Specifically, the likelihood calculating unit 118 acquires the likelihood of the likelihood calculation zone by summing the values obtained by taking the logarithm of the replaced output probabilities over all frames from the beginning to the end of the likelihood calculation zone. In other words, the likelihood calculated by the likelihood calculating unit 118 becomes larger to the extent that the likelihood calculation zone includes more frames with a high output probability.

The repeating unit 119 changes the likelihood calculation zone designated by the zone designating unit 114, and repeats the processes of the zone designating unit 114, the feature quantity calculating unit 115, the output probability acquiring unit 116, the replacing unit 117, and the likelihood calculating unit 118.

Described specifically with reference to FIG. 3(c), the repeating unit 119 shifts the likelihood calculation zone designated by the zone designating unit 114 by one frame, and newly designates the 1st likelihood calculation zone of time length L that includes M frames from the 1st frame to the Mth frame. Subsequently, in the newly designated 1st likelihood calculation zone, processes similar to the processes of the feature quantity calculating unit 115 to the likelihood calculating unit 118 discussed above are executed, and the likelihood of the 1st likelihood calculation zone is calculated.

Similarly, the repeating unit 119 shifts the likelihood calculation zone designated by the zone designating unit 114 by one frame at a time from the 2nd likelihood calculation zone to the (P−1)th likelihood calculation zone, and the likelihood is calculated for each of the P likelihood calculation zones that are specifiable in the target voice signal. As a result, for every one frame of the target voice signal, the likelihood is calculated for the case of assuming that the voice corresponding to the search string is spoken in that zone. Note that the number P of likelihood calculation zones that are specifiable in the target voice signal is determined as P=(T−L+S)/S, using the time length T of the voice signal, the time length L of each likelihood calculation zone, and the shift length S.

The selecting unit 120, on the basis of the likelihood calculated by the likelihood calculating unit 118, selects from among the likelihood calculation zones designated by the zone designating unit 114 a plurality of estimated zone candidates for which the voice corresponding to the search string is estimated to be spoken in the target voice signal. In other words, to moderate the computational complexity of accurate likelihood calculation based on the triphone model discussed later, the selecting unit 120 preliminarily selects zones that acts as candidates for the final search result from among the P likelihood calculation zones for which the likelihood is calculated, and excludes the remaining likelihood calculation zones from the candidates.

At this point, since the likelihood calculation zones designated by the zone designating unit 114 largely overlap, zones of high likelihood are often temporally consecutive. For this reason, if the selecting unit 120 simply selects estimated zone candidates in order of highest likelihood from among the P likelihood calculation zones, there is an increased possibility that the selected zones will be concentrated on one part of the target voice signal.

To avoid this situation, the selecting unit 120 selects the plurality of estimated zone candidates by selecting, one likelihood calculation zone of maximum likelihood at a time for every predetermined selection time length from among the likelihood calculation zones that start from an zone in the predetermined selection time length from among the likelihood calculation zones designated by the zone designating unit 114. The predetermined selection time length is set to a shorter time than the time length L of the likelihood calculation zone, such as a time length that corresponds to 1/k (for example, ½) of the time length L of the likelihood calculation zone, for example. In this case, one likelihood calculation zone at a time is selected as a candidate for each time length (L/k), while the remaining are excluded from the candidates. As a result, the selecting unit 120 is able to evenly select estimated zone candidates across the entire target voice signal.

From among the estimated zone candidates selected in this way, the selecting unit 120 additionally selects x zones in order of the zones with the highest likelihood. The selection results from the selecting unit 120 are externally displayed via a screen provided in the output device 5. After that, the voice search device 100 executes an accurate likelihood calculation process based on the triphone model and dynamic programming (DP) matching on the selected x zones.

The second converting unit 121 sorts phonemes of the triphone model, which is a second acoustic model that depends on adjacent phonemes, in accordance with the search string acquired by the search string acquiring unit 111, and converts the search string into a second phoneme sequence which is a triphone phoneme sequence. For example, if the Japanese word "ramen" is input as the search string, since "ramen" includes the three triphones of "r−a:+m", "a:−m+e", and "m−e+N", the second converting unit 121 generates a triphone phoneme sequence made up of the arrangement of these three triphones.

The second output probability acquiring unit 122 acquires, for each frame, an output probability of a feature quantity of the target voice signal in an zone selected by the selecting unit 120 as an estimated zone candidate being output from each phoneme included in the second phoneme sequence converted by the second converting unit 121. Specifically, the second output probability acquiring unit 122 acquires the triphone model from the triphone model storage 103, and compares the feature quantity in each frame calculated by the feature quantity calculating unit 115 to the model of each triphone included in the triphone phoneme sequence. Subsequently, the second output probability acquiring unit 122 calculates the probability that the feature quantity in each frame will be output from each triphone.

The second likelihood calculating unit 123 calculates, for each of the plurality of candidates selected by the selecting unit 120, a second likelihood that indicates how likely the zone selected as an estimated zone candidate by the selecting unit 120 is an zone in which the voice corresponding to the search string is spoken. The second likelihood is calculated on the basis of the second phoneme sequence which is a triphone phoneme sequence, and thus is a index that more accurately indicates the degree of similarly between the voice corresponding to the search string and the voice signal of the selected zone compared to the likelihood calculated by the likelihood calculating unit 118 on the basis of the monophone phoneme sequence and the lower-bounded output probability.

For example, the second likelihood calculating unit 123, on the basis of the output probabilities acquired by the second output probability acquiring unit 122, uses DP matching to search for correspondences between each frame in the zone selected by the selecting unit 120 and each triphone included in the triphone phoneme sequence. Subsequently, the values obtained by taking the logarithm of the output probabilities acquired for each of the triphones associated with each frame in the zone selected by the selecting unit 120 are—summed to obtain the second likelihood for that zone.

The identifying unit 124, on the basis of the second likelihood calculated by the second likelihood calculating unit 123, identifies estimated zones from among the plurality of candidates selected by the selecting unit 120 for which the voice corresponding to the search string is estimated to be spoken in the target voice signal. For example, the identifying unit 124 identifies a predetermined number of zones in order of largest second likelihood calculated by the second likelihood calculating unit 123 as the estimated zones. Position information about the zones identified by the identifying unit 124 is externally displayed via a screen provided in the output device 5 as the final search result.

A flow of a voice search process executed by the voice search device 100 as above will be described with reference to the flowchart illustrated in FIG. 5.

Figure 5:
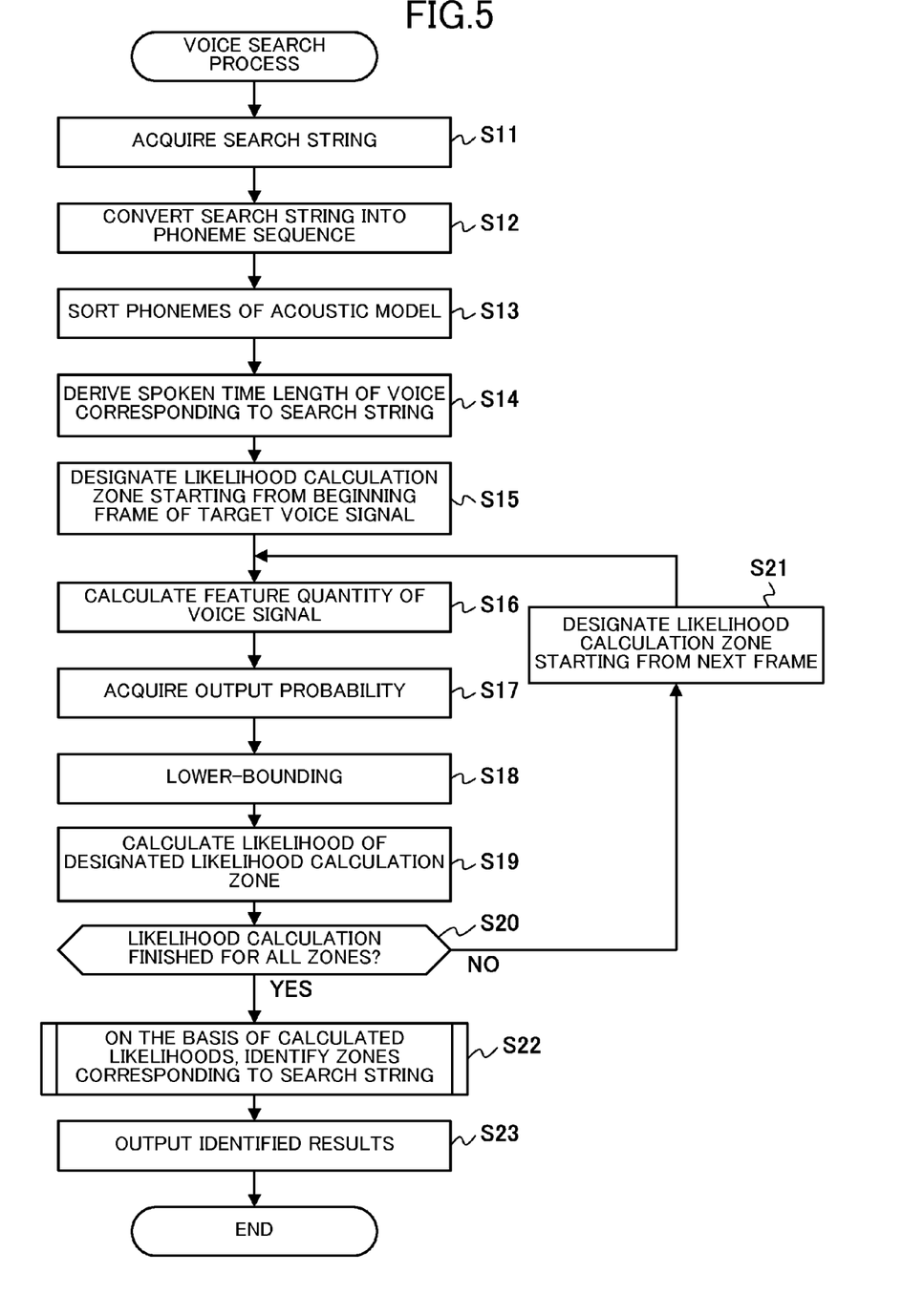
FIG. 5 is a flowchart illustrating the flow of a voice search process executed by a voice search device according to Embodiment 1 of the present disclosure.

The process of the flowchart illustrated in FIG. 5 starts when the search string acquiring unit 111 acquires a search string (step S11). After the search string acquiring unit 111 acquires a search string, the converting unit 112 and the second converting unit 121 convert the search string into phoneme sequences (step S12), and sort phonemes of the acoustic models in the phoneme order of the phoneme sequences (step S13). Specifically, the converting unit 112 converts the search string into a monophone phoneme sequence made up of monophones, while the second converting unit 121 converts the search string into a triphone phoneme sequence made up of triphones.

After the search string is converted into phoneme sequences, the time length deriving unit 113 derives the spoken time length of the voice corresponding to the search string (step S14). Specifically, the time length deriving unit 113 acquires the average duration stored for every phoneme state in the time length storage 104, and by summing the acquired average durations, derives the spoken time length of the voice corresponding to the search string.

After the time length deriving unit 113 derives the spoken time length, the voice search process successively designates likelihood calculation zones, which are zones of the derived spoken time length, from the beginning to the end of the target voice signal, and proceeds to the process of calculating likelihood. First, the zone designating unit 114 designates the likelihood calculation zone starting from the beginning frame of the target voice signal (step S15).

After the zone designating unit 114 designates a likelihood calculation zone, the feature quantity calculating unit 115 calculates for each frame a feature quantity of the voice signal of the designated likelihood calculation zone (step S16). Subsequently, the output probability acquiring unit 116, on the basis of the feature quantity calculated by the feature quantity calculating unit 115 and the corresponding monophone model, acquires for each frame an output probability of the feature quantity being output from each phoneme included in the phoneme sequence (step S17).

After the output probability acquiring unit 116 acquires the output probabilities, the replacing unit 117 executes a lower-bounding process by replacing the output probability acquired for each frame with the maximum output probability from among n adjacent frames (step S18). As a result, error between the spoken time length derived by the time length deriving unit 113 and the actual spoken time length is absorbed.

The likelihood calculating unit 118 calculates the likelihood of the likelihood calculation zone designated by the zone designating unit 114 by taking a sum along the logarithmic axis of the lower-bounded output probabilities (step S19). After the likelihood calculating unit 118 calculates the likelihood, the repeating unit 119 determines whether or not the likelihood calculation has finished for all zones in the target voice signal (step S20).

If the likelihood calculation is not finished for all zones (step S20; No), the zone designating unit 114 designates a likelihood calculation zone starting from the next frame after the previously designated frame (step S21), and the voice search process returns to step S16. Subsequently, the repeating unit 119 repeats the processes in the above steps S16 to S20 on the newly designated likelihood calculation zone, and calculates the likelihood. In this way, the repeating unit 119 successively calculates the likelihood by shifting the likelihood calculation zone designated by the zone designating unit 114 one frame at a time until reaching the end of the target voice signal.

Finally, after the likelihood calculation finishes for all zones (step S20; Yes), the voice search process proceeds to a process of identifying zones corresponding to the search string on the basis of the calculated likelihoods (step S22). Details of the identification process will be described with reference to the flowchart illustrated in FIG. 6.

Figure 6:
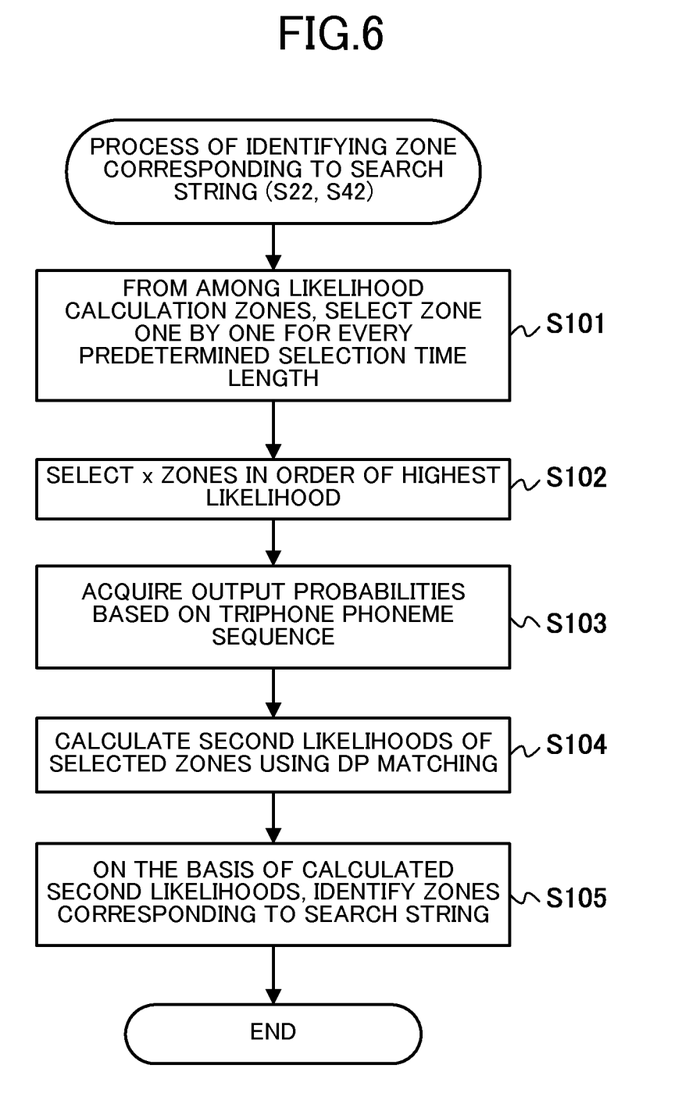
FIG. 6 is a flowchart illustrating the flow of a process of identifying a zone corresponding to a search string.

When the likelihood calculation process has finished, the selecting unit 120 selects from among likelihood calculation zones designated by the zone designating unit 114, zone one by one for every predetermined selection time length (step S101). Additionally, from among the zones selected in this way, the selecting unit 120 selects x zones in order of highest likelihood (step S102). In other words, the selecting unit 120 preliminarily selects zone candidates to identify as the final search results, so that candidates evenly remain from across the entire target voice signal.

After the preliminary selection by the selecting unit 120, on the basis of the triphone phoneme sequence, the second output probability acquiring unit 122 acquires, for each frame, the output probability in the zones selected by the selecting unit 120 (step S103). Subsequently, the second likelihood calculating unit 123 calculate the likelihood of the zones selected by the selecting unit 120 using DP matching (step S104). In other words, on the basis of the triphone model and DP matching, the second output probability acquiring unit 122 and the second likelihood calculating unit 123 execute a likelihood calculation process that is more accurate compared to the output probability acquiring unit 116 and the likelihood calculating unit 118.

After the second likelihood calculating unit 123 calculates the second likelihood, the identifying unit 124 identifies zones corresponding to the search string on the basis of the calculated second likelihood (step S105). For example, the identifying unit 124 identifies a predetermined number of zones in order of largest second likelihood calculated by the second likelihood calculating unit 123 as the zones for which the voice corresponding to the search string is estimated to be spoken. After that, the process of the flowchart illustrated in FIG. 6 ends.

Returning to the description of the flowchart illustrated in FIG. 5, after zones corresponding to the search string are identified, the identifying unit 124 outputs an identification result via the output device 5 (step S23). As a result of the above, the voice search process executed by the voice search device 100 ends.

As described above, the voice search device 100 according to Embodiment 1 acquires a search word as a text string, and identifies zones from among the target voice signal in which the voice corresponding to the search word is estimated to be spoken. Since the search word is acquired as a string, fast and accurate voice search is possible even in cases such as when the target voice includes the voice of multiple speakers, the voice of the person who inputs the search word is acoustically peculiar, or the person who inputs the search word has difficulty speaking in the first place.

Also, the voice search device 100 according to Embodiment 1 first conducts matching of low computational complexity using a monophone model which is a fast acoustic model with fixed state transitions, and thereby preliminarily selects zone candidates in which the voice corresponding to the search word is estimated to be spoken. After that, the voice search device 100 obtains a final search result by conducting an accurate matching of high computational complexity using a triphone model which is an acoustic model that accounts for state transitions. As a result, the voice search device 100 is able to retrieve voice accurately while moderating the computational complexity.

(Embodiment 2)

Next, Embodiment 2 of the present invention will be described.

In Embodiment 1, the time length deriving unit 113 derived one time length as the spoken time length of voice corresponding to one search string acquired by the search string acquiring unit 111. In addition, the error between the spoken time length derived by the time length deriving unit 113 and the actual spoken time length is absorbed by the range of n frames adjacent to each phoneme by lower-bounding.

However, if the speech speed is fast or slow in the first place, there is a problem in that the derived spoken time length may become longer or shorter compared to the actual spoken time length, and exceed the range of n adjacent frames. To address this issue, in Embodiment 2, the time length deriving unit 113 derives a plurality of mutually different time lengths as the spoken time length of voice corresponding to one search string acquired by the search string acquiring unit 111.

For this reason, in Embodiment 2, the time length storage 104 associates and stores three types of time lengths, namely, an average duration of each phoneme used by the acoustic models, a short time length that is shorter than the average duration, and a long time length that is longer than the average duration, associated in units of the states of each phoneme. The time length that is longer than the average duration is 1.3 times the length of the average duration, for example. The time length that is shorter than the average duration is 0.7 times the length of the average duration, for example.

In other words, the voice search device 100 according to Embodiment 2 prepares time lengths corresponding to three speeds of voice (fast, normal, and slow) as durations for every state of each phoneme. As a result, degraded search accuracy due to differences in the speed of voice is prevented.

A flow of a voice search process executed by the voice search device 100 according to Embodiment 2 will be described with reference to the flowchart illustrated in FIG. 7.

Figure 7:
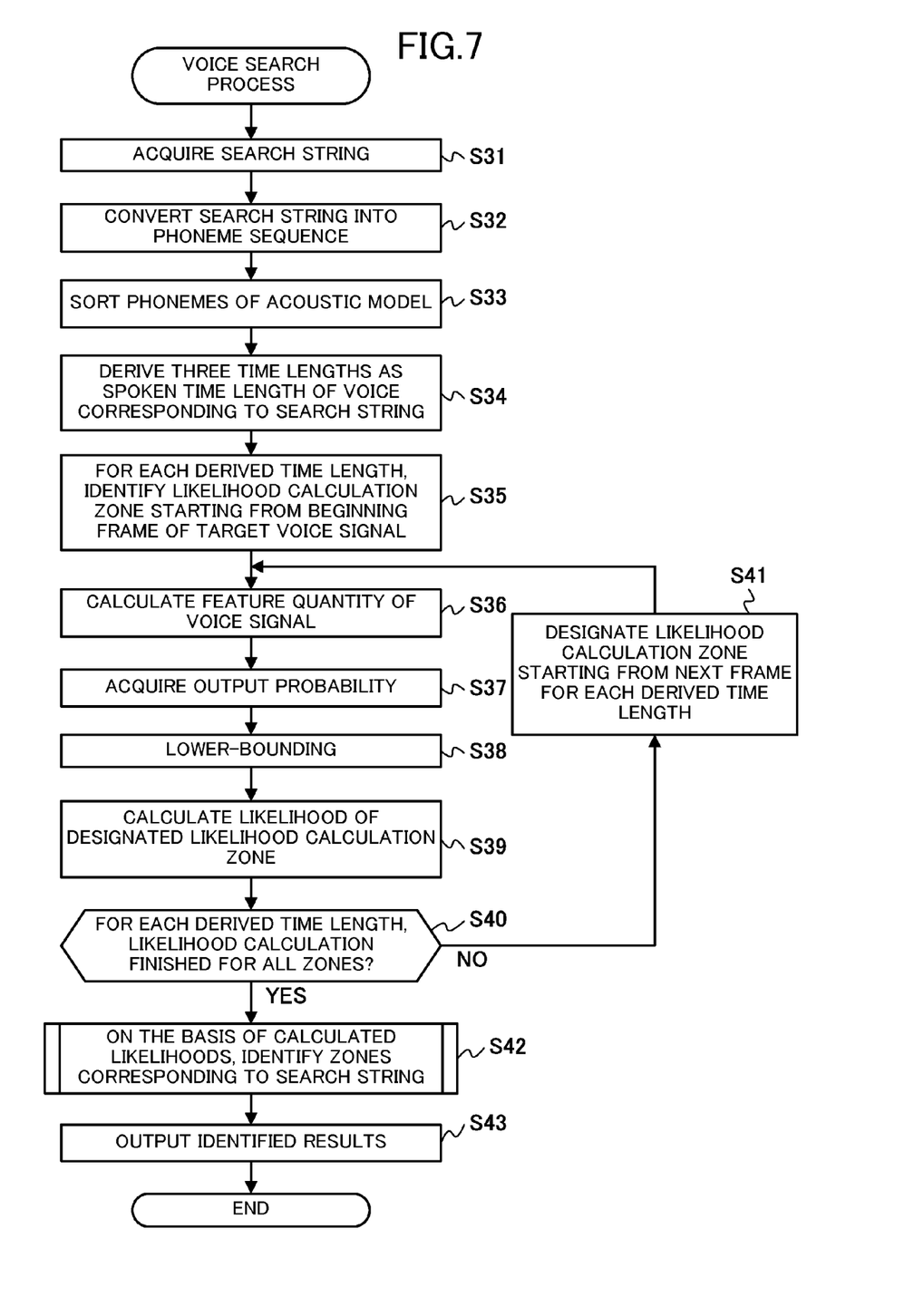
FIG. 7 is a flowchart illustrating the flow of a voice search process executed by a voice search device according to Embodiment 2 of the present disclosure.

The process of the flowchart illustrated in FIG. 7 starts when the search string acquiring unit 111 acquires a search string (step S31). After the search string acquiring unit 111 acquires a search string, the converting unit 112 and the second converting unit 121 convert the search string into phoneme sequences (step S32), and sort phonemes of the acoustic models in the phoneme order of the phoneme sequences (step S33). Specifically, the converting unit 112 converts the search string into a monophone phoneme sequence made up of monophones, while the second converting unit 121 converts the search string into a triphone phoneme sequence made up of triphones.

After the search string is converted into phoneme sequences, the time length deriving unit 113 derives three time lengths as the spoken time length of the voice corresponding to the search string (step S34). For the three time lengths, first, the time length deriving unit 113 acquires the average duration stored for every state in the time length storage 104, and by summing the acquired average durations, derives a first time length. Second, the time length deriving unit 113 acquires the time length that is shorter than the average duration stored for every state in the time length storage 104, and by summing the acquired time lengths, derives a second time length. Third, the time length deriving unit 113 acquires the time length that is longer than the average duration stored for every state in the time length storage 104, and by summing the acquired time lengths, derives a third time length.

If the time length that is shorter than the average duration stored for every state in the time length storage 104 is uniformly 0.7 times the length of the average duration, the second time length becomes 0.7 times the length of the first time length. If the time length that is longer than the average duration stored for every state in the time length storage 104 is uniformly 1.3 times the length of the average duration, the third time length becomes 1.3 times the length of the first time length.

After the time length deriving unit 113 derives the three time lengths as the spoken time length, the voice search process successively designates likelihood calculation zones, which are zones of each derived time length, from the beginning to the end of the target voice signal, and proceeds to the process of calculating likelihood. First, for each of the three time lengths derived by the time length deriving unit 113, the zone designating unit 114 designates the likelihood calculation zone that starts from the beginning frame of the target voice signal (step S35).

After the zone designating unit 114 designates a likelihood calculation zone for each time length, the feature quantity calculating unit 115 calculates for each frame a feature quantity of the voice signal of the designated likelihood calculation zone (step S36). Subsequently, the output probability acquiring unit 116, on the basis of the feature quantity calculated by the feature quantity calculating unit 115 and the corresponding monophone model, acquires for each frame an output probability of the feature quantity being output from each phoneme included in the phoneme sequence (step S37).

After the output probability acquiring unit 116 acquires the output probabilities, the replacing unit 117 executes a lower-bounding process by replacing the output probability acquired for each frame with the maximum output probability from among n adjacent frames (step S38). As a result, error between the spoken time length derived by the time length deriving unit 113 and the actual spoken time length is absorbed.

The likelihood calculating unit 118 calculates the likelihood of the likelihood calculation zone designated by the zone designating unit 114 for each of the three time lengths by taking a sum along the logarithmic axis of the lower-bounded output probabilities (step S39). After the likelihood calculating unit 118 calculates the likelihood, the repeating unit 119 determines, for each time length derived by the time length deriving unit 113, whether or not the likelihood calculation has finished for all zones in the target voice signal (step S40).

If the likelihood calculation is not finished for all zones (step S40; No), for each of the three time lengths derived by the time length deriving unit 113, the zone designating unit 114 designates a likelihood calculation zone starting from the next frame after the previously designated frame (step S41), and the voice search process returns to step S36. Subsequently, the repeating unit 119 repeats the processes in the above steps S36 to S40 on the newly designated likelihood calculation zone for each time length, and calculates the likelihood. In this way, the repeating unit 119 successively calculates the likelihood by shifting the likelihood calculation zone designated by the zone designating unit 114 one frame at a time until reaching the end of the target voice signal.

Finally, after the likelihood calculation finishes for all zones (step S40; Yes), the voice search process proceeds to a process of identifying zones corresponding to the search string on the basis of the calculated likelihoods (step S42). The identification process is similar to the process described with reference to the flowchart in FIG. 6.

In other words, the selecting unit 120 selects one zone at a time for every predetermined selection time length from among the likelihood calculation zones designated by the zone designating unit 114 for each of the three time lengths (step S101). Additionally, from among the zones selected in this way, the selecting unit 120 selects x zones in order of highest likelihood (step S102). On the basis of the triphone phoneme sequence, the second output probability acquiring unit 122 acquires, for each frame, the output probability in the zone selected by the selecting unit 120 (step S103). The second likelihood calculating unit 123 uses DP matching to calculate the likelihood of the zones selected by the selecting unit 120 (step S104). Subsequently, on the basis of the calculated second likelihood, the identifying unit 124 identifies zones for which the voice corresponding to the search string is estimated to be spoken (step S105).

After zones corresponding to the search string are identified, the identifying unit 124 outputs an identification result via the output device 5 (step S43). As a result of the above, the voice search process executed by the voice search device 100 ends.

As described above, the voice search device 100 according to Embodiment 2 derives three time lengths corresponding to three speeds of voice (fast, normal, and slow) as the spoken time length of the voice corresponding to the search string. Subsequently, zones of time lengths that respectively correspond to the three derived time lengths are designated as likelihood calculation zones, and zones for which the voice corresponding to the search string is estimated to be spoken are identified from the designated likelihood calculation zones. As a result, degraded likelihood and the loss of candidates due to differences in the speed of voice may be reduced, and search accuracy may be improved, even for voice search on a voice signal that does not correspond to an average speed of voice.

(Embodiment 3)

Next, Embodiment 3 of the present invention will be described.

The voice search device 100 according to Embodiment 1 and Embodiment 2 executes the calculation of output probability used to calculate likelihood after the search string acquiring unit 111 acquires the search string. However, the calculation of output probability is a computationally complex process. Accordingly, the voice search device according to Embodiment 3 attempts to speed up search by pre-calculating the output probability using the monophone model that is used for preliminary selection of zone candidates corresponding to the search string. Embodiment 3 is described below.

The voice search device according to Embodiment 3 is physically configured as illustrated in FIG. 1, similarly to the voice search device 100 according to Embodiment 1. For this reason, detailed description will be reduced or omitted herein.

Figure 8:
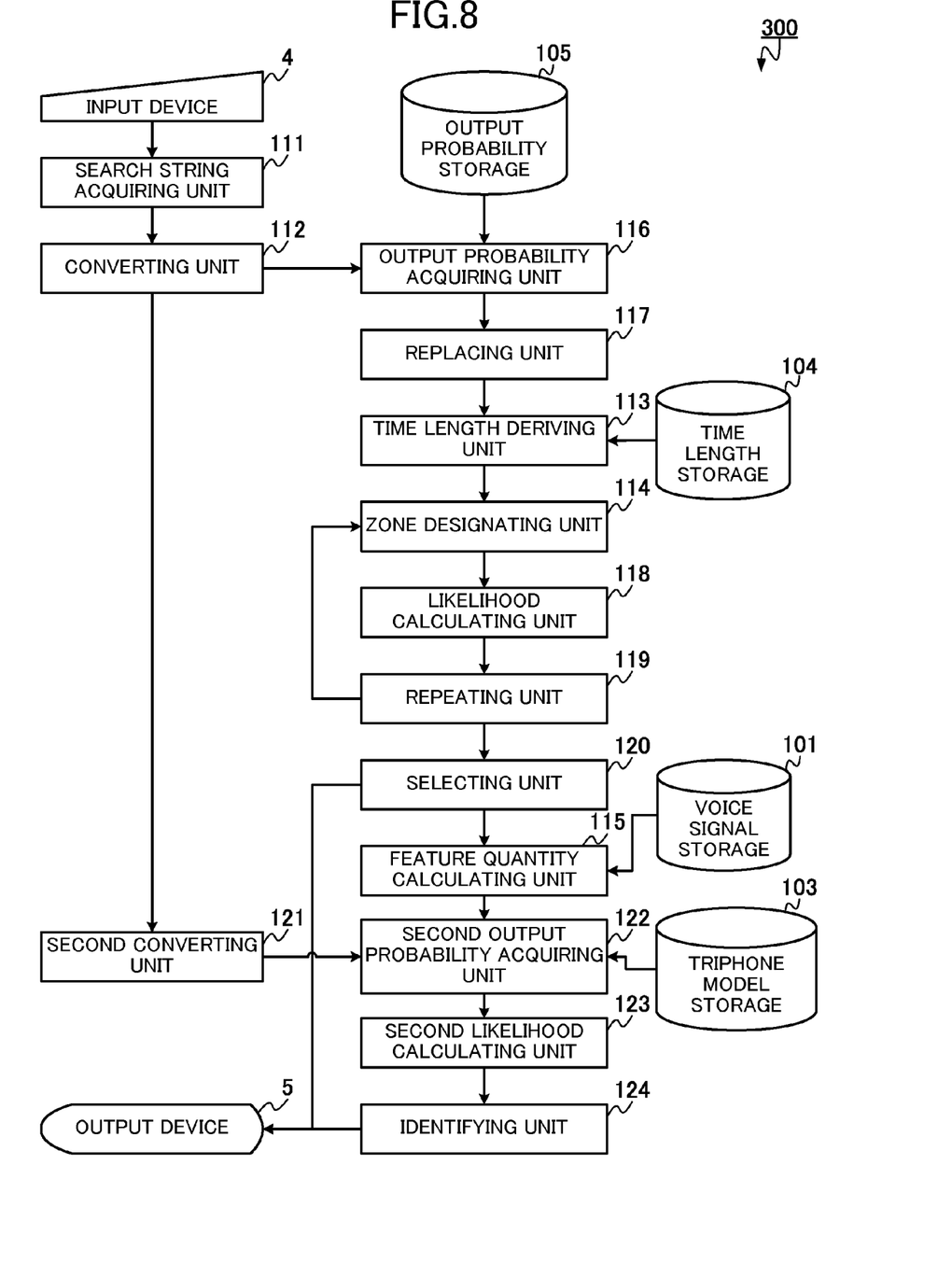
FIG. 8 is a diagram illustrating a functional configuration of a voice search device according to Embodiment 3 of the present disclosure.

The voice search device according to Embodiment 3 is functionally configured as illustrated in FIG. 8. The voice search device 300 is not equipped with the monophone model storage 102 provided in the voice search device 100 according to Embodiment 1 and Embodiment 2, and is instead equipped with output probability storage 105. The output probability storage 105 is constructed as a storage area in the external storage device 3. Also, the processing by the respective components is conducted in a different order compared to the voice search device 100 according to Embodiment 1 and Embodiment 2. Hereinafter, the respective components will be described in detail.

The output probability storage 105 stores each phoneme of an acoustic model in association with an output probability of a feature quantity of the target voice signal being output from the relevant phoneme, for every frame included in the target voice signal. The acoustic model is the monophone model used during preliminary selection. For example, monophones of the Japanese language include approximately 40 phonemes in total. The output probability storage 105 stores the results of pre-calculating the output probability of all frames from the beginning to the end of the target voice signal for the 123 states of 41 phonemes (the above 40 phonemes plus a silent phoneme) as a search index.

For example, assuming that the output probability per state is saved in 8 bytes in double format, the output probability per frame may be stored in approximately 960 bytes. Meanwhile, the volume of a voice signal is 320 bytes per shift length, assuming a shift length S of 10 ms under 16-bit PCM/16 kHz sampling conditions. For this reason, the volume required to store the output probability must be as high as three times the volume required to store the voice signal.

Note that the process of pre-calculating the output probability using the monophone model may be executed by the voice search device 300. Alternatively, another information processing device may calculate the output probability, and the voice search device 300 may acquire and store the result in the output probability storage 105.

The search string acquiring unit 111 acquires a search string. The search string acquiring unit 111 acquires a search string input by the user via the input device 4, for example. The converting unit 112 sorts phonemes of the monophone model, which is an acoustic model that does not depend on adjacent phonemes, in accordance with the search string acquired by the search string acquiring unit 111, and converts the search string into a phoneme sequence.

After the converting unit 112 converts the search string into a phoneme sequence, the output probability acquiring unit 116 acquires the output probability stored in association with each phoneme included in the phoneme sequence from among the output probabilities stored in the output probability storage 105. Specifically, the output probability acquiring unit 116 acquires the output probabilities of phonemes required for search from among the output probabilities of all phonemes of the monophone model stored per frame for all frames of the target voice signal.

After the output probability acquiring unit 116 acquires the output probabilities, the replacing unit 117 executes the lower-bounding process on the acquired output probabilities. In other words, the replacing unit 117 replaces the output probabilities acquired for all frames of the target voice signal with the output probability of maximum value from among the multiple output probabilities acquired in multiple consecutive frames.

The time length deriving unit 113 acquires, from the time length storage 104, the average duration of each phoneme included in the phoneme sequence converted by the converting unit 112. Subsequently, on the basis of the acquired average durations, the time length deriving unit 113 derives the spoken duration of the voice corresponding to the search string. The zone designating unit 114 designates likelihood calculation zones, which are zones of the time length derived by the time length deriving unit 113, in order from the beginning of the target voice signal.

The likelihood calculating unit 118, on the basis of the output probabilities replaced by the replacing unit 117, calculates a likelihood that indicates how likely the likelihood calculation zone designated by the zone designating unit 114 is an zone in which the voice corresponding to the search string is spoken. Described specifically, the likelihood calculating unit 118 identifies each frame in the likelihood calculation zone designated by the zone designating unit 114, and the replaced output probability of the state corresponding to the relevant frame from among the states of the phonemes included in the phoneme sequence. Subsequently, the likelihood calculating unit 118 obtains the likelihood of the likelihood calculation zone by summing the values obtained by taking the logarithm of the identified output probabilities over all frames from the beginning to the end of the likelihood calculation zone.

The repeating unit 119 shifts the likelihood calculation zone designated by the zone designating unit 114 by one frame at a time, and repeats the processes of the zone designating unit 114 and the likelihood calculating unit 118. Subsequently, the repeating unit 119 calculates the likelihood for each likelihood calculation zone that is specifiable in the target voice signal.

The selecting unit 120, on the basis of the likelihood calculated by the likelihood calculating unit 118, selects from among the likelihood calculation zones designated by the zone designating unit 114 a plurality of candidates of estimated zones for which the voice corresponding to the search string is estimated to be spoken in the target voice signal. The selection results from the selecting unit 120 are externally displayed via a screen provided in the output device 5. After that, the voice search device 300 executes an accurate likelihood calculation process based on the triphone model and DP matching on the selected x zones.

The feature quantity calculating unit 115 acquires a target voice signal from the voice signal storage 101, and calculates a feature quantity of the target voice signal for each frame. The second converting unit 121 sorts phonemes of the triphone model, which is a second acoustic model that depends on adjacent phonemes, in accordance with the search string acquired by the search string acquiring unit 111, and converts the search string into a second phoneme sequence which is a triphone phoneme sequence.

The second output probability acquiring unit 122 acquires the triphone model from the triphone model storage 103, and acquires, for each frame, an output probability of a feature quantity of the target voice signal in an zone selected by the selecting unit 120 as a candidate of an estimated zone being output from each phoneme included in the triphone phoneme sequence converted by the second converting unit 121.

The second likelihood calculating unit 123 calculates, for each of the plurality of candidates selected by the selecting unit 120, a second likelihood that indicates how likely the zone selected as an estimated zone candidate by the selecting unit 120 is an zone in which the voice corresponding to the search string is spoken.

For example, the second likelihood calculating unit 123, on the basis of the output probabilities acquired by the second output probability acquiring unit 122, uses DP matching to search for correspondences between each frame in the zone selected by the selecting unit 120 and each triphone included in the triphone phoneme sequence. Subsequently, the values obtained by taking the logarithm of the output probabilities acquired for each of the triphones associated with each frame in the zone selected by the selecting unit 120 are summed to obtain the second likelihood for that zone.

The identifying unit 124, on the basis of the second likelihood calculated by the second likelihood calculating unit 123, identifies estimated zones from among the plurality of candidates selected by the selecting unit 120 for which the voice corresponding to the search string is estimated to be spoken in the target voice signal. For example, the identifying unit 124 identifies a predetermined number of zones in order of largest second likelihood calculated by the second likelihood calculating unit 123 as the estimated intervals. Position information about the intervals identified by the identifying unit 124 is externally displayed via a screen provided in the output device 5 as the final search result.

As described above, the voice search device 300 according to Embodiment 3 does not calculate the output probability during the likelihood calculation for preliminary selection, but instead pre-calculates the output probabilities of the entire target voice signal, and stores the pre-calculated output probabilities as a search index. Subsequently, at the time of search, the voice search device 300 preliminarily selects candidates of the final result by using the search index, and calculates the output probability using the triphone phonemes included in the search string on only the zones that remain as candidates. As a result, fast voice search is possible.

Note that a configuration for realizing functionality according to the present disclosure may be provided as a voice search device with the functionality already built in, or by applying a program to cause a device such as an existing personal computer or information terminal to function as a voice search device according to the present disclosure. In other words, by applying a program for realizing the functional configurations of the voice search devices 100 and 300 exemplified in the foregoing embodiments so that the program may be executed by a CPU or the like that controls a device such as an existing personal computer or information terminal, the device may be made to function as a voice search device according to the present disclosure. In addition, a voice search method according to the present disclosure may be performed using a voice search device.

Furthermore, the method of implementing such a program is arbitrary. The program may be implemented by being stored on a computer-readable recording medium (such as a Compact Disc-Read-Only Memory (CD-ROM), a Digital Versatile Disc (DVD), or a magneto-optical (MO) disc), for example. Additionally, the program may also be implemented by being stored in storage on a network such as the Internet and downloaded.

The foregoing describes some example embodiments for explanatory purposes. Although the foregoing discussion has presented specific -embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A voice search device comprising:
a processor; and
a memory storing instructions that, when executed by the processor, control the processor to:
convert a search string into a phoneme sequence;
acquire durations of respective phonemes included in the phoneme sequence;
derive a spoken time length of voice corresponding to the search string based on the durations;
designate a plurality of designated zones having time lengths in a target voice signal;
acquire, using an acoustic model that does not depend on adjacent phonemes, a first group of likelihoods indicating how likely each zone from among the plurality of designated zones is a zone in which voice corresponding to the search string is spoken;
specify, based on the first group of likelihoods, a plurality of estimated zones from among the plurality of designated zones, wherein each estimated zone is a zone in which the voice corresponding to the search string is estimated to be spoken, and wherein a number of the estimated zones is less than a number of the plurality of designated zones; and
acquire, using an acoustic model that depends on adjacent phonemes, a second group of likelihoods indicating how likely each of the plurality of estimated zones is a zone in which the voice corresponding to the search string is spoken.

2. The voice search device according to claim 1, wherein the instructions, when executed by the processor, further control the processor to:
acquire, for each frame, an output probability of a feature quantity of the target voice signal being output from each phoneme included in the phoneme sequence; and
wherein the first group of likelihoods are acquired based on the acquired output probability.

3. The voice search device according to claim 2, wherein the instructions, when executed by the processor, further control the processor to:
calculate, for each frame, a feature quantity of the target voice signal in the plurality of designated zones;
wherein the output probability is acquired based on the calculated feature quantity.

4. The voice search device according to claim 2, further comprising:
an output probability storage in which each phoneme of an acoustic model is stored in association with the output probability of the feature quantity of the target voice signal being output from the each phoneme, for every frame included in the target voice signal;
wherein, after the search string is converted into the phoneme sequence, an output probability stored in association with each phoneme included in the phoneme sequence is acquired from among the output probabilities stored in the output probability storage.

5. The voice search device according to claim 2, wherein the instructions, when executed by the processor, further control the processor to:
replace the output probability acquired for each frame with an output probability of maximum value from among a plurality of output probabilities acquired in a plurality of consecutive frames that includes the output probability;
wherein the first group of likelihoods are acquired based on a replaced output probability.

6. The voice search device according to claim 1, wherein the plurality of estimated zones are specified by selecting a designated zone of maximum likelihood one by one from among designated zones included in a zone of a predetermined selection time length, for every predetermined selection time length.

7. The voice search device according to claim 1, wherein the instructions, when executed by the processor, further control the processor to:
derive a plurality of mutually different time lengths as spoken time lengths of voice corresponding to one search string,
designate the plurality of designated zones having the time lengths in the target voice signal for each of the plurality of mutually different time lengths,
acquire the first group of likelihoods for each of the plurality of mutually different time lengths, and
specify, based on first group of likelihoods, the plurality of estimated zones for each of the plurality of time lengths.

8. The voice search device according to claim 1, wherein the instructions, when executed by the processor, further control the processor to:
specify a zone corresponding to the search word from among the plurality of estimated zones based on the second group of likelihoods.

9. A voice search method comprising:
converting a search string into a phoneme sequence;
acquiring durations of respective phonemes included in the phoneme sequence;
deriving a spoken time length of voice corresponding to the search string based on the durations;
designating a plurality of designated zones having time lengths in a target voice signal;
acquiring, using an acoustic model that does not depend on adjacent phonemes, a first group of likelihoods indicating how likely each zone from among the plurality of designated zones is a zone in which voice corresponding to the search string is spoken;
specifying, based on the first group of likelihoods, a plurality of estimated zones from among the plurality of designated zones, wherein each estimated zone is a zone in which the voice corresponding to the search string is estimated to be spoken, and wherein a number of the estimated zones is less than a number of the plurality of designated zones; and
acquiring, using an acoustic model that depends on adjacent phonemes, a second group of likelihoods indicating how likely each of the plurality of estimated zones is a zone in which the voice corresponding to the search string is spoken.

10. The voice search method according to claim 9, further comprising:

acquiring, for each frame, an output probability of a feature quantity of the target voice signal being output from each phoneme included in the phoneme sequence;

wherein the first group of likelihoods are acquired based on the acquired output probability.

11. The voice search method according to claim 10, further comprising:

calculating, for each frame, a feature quantity of the target voice signal in the plurality of designated zones;

wherein the output probability is acquired based on the calculated feature quantity.

12. The voice search method according to claim 10, further comprising:

storing each phoneme of an acoustic model in association with the output probability of the feature quantity of the target voice signal being output from the each phoneme, for every frame included in the target voice signal;

wherein after the search string is converted into the phoneme sequence, an output probability stored in association with each phoneme included in the phoneme sequence is acquired from among the stored output probabilities.

13. The voice search method according to claim 10, further comprising:

replacing the output probability acquired for each frame with an output probability of maximum value from among a plurality of output probabilities acquired in a plurality of consecutive frames that includes the output probability;

wherein the first group of likelihoods are acquired based on a replaced output probability.

14. The voice search method according to Claim 13, wherein the plurality of estimated zones are specified by selecting a designated zone of maximum likelihood one by one from among designated zones included in a zone of a predetermined selection time length, for every predetermined selection time length.

15. The voice search method according to claim 9, further comprising:

deriving a plurality of mutually different time lengths as spoken time lengths of voice corresponding to one search string, designating the plurality of designated zones having the time lengths in the target voice signal for each of the plurality of mutually different time lengths, acquiring the first group of likelihoods for each of the plurality of mutually different time lengths, and specifying, based on the first group of likelihoods, the plurality of estimated zones for each of the plurality of time lengths.

16. The voice search method according to claim 9, further comprising:

specifying a zone corresponding to the search word from among the plurality of estimated zones based on the second group of likelihoods.

17. A non-transitory recording medium having a program recorded thereon that is executable to control a computer to:

convert a search string into a phoneme sequence;

acquire durations of respective phonemes included in the phoneme sequence;

derive a spoken time length of voice corresponding to the search string based on the durations;

designate a plurality of designated zones having time lengths in a target voice signal;

acquire, using an acoustic model that does not depend on adjacent phonemes, a first group of likelihoods indicating how likely each zone from among the plurality of designated zones is a zone in which voice corresponding to the search string is spoken;

specify, based on the first group of likelihoods, a plurality of estimated zones from among the plurality of designated zones, wherein each estimated zone is a zone in which the voice corresponding to the search string is estimated to be spoken, and wherein a number of the estimated zones is less than a number of the plurality of designated zones; and acquire, using an acoustic model that depends on adjacent phonemes, a second group of likelihoods indicating how likely each of the plurality of estimated zones is a zone in which the voice corresponding to the search string is spoken.

18. The non-transitory recording medium according to claim 17, wherein the program is executable to further control the processor to:

specify a zone corresponding to the search word from among the plurality of estimated zones based on the second group of likelihoods.

* * * * *